Patented Dec. 2, 1952

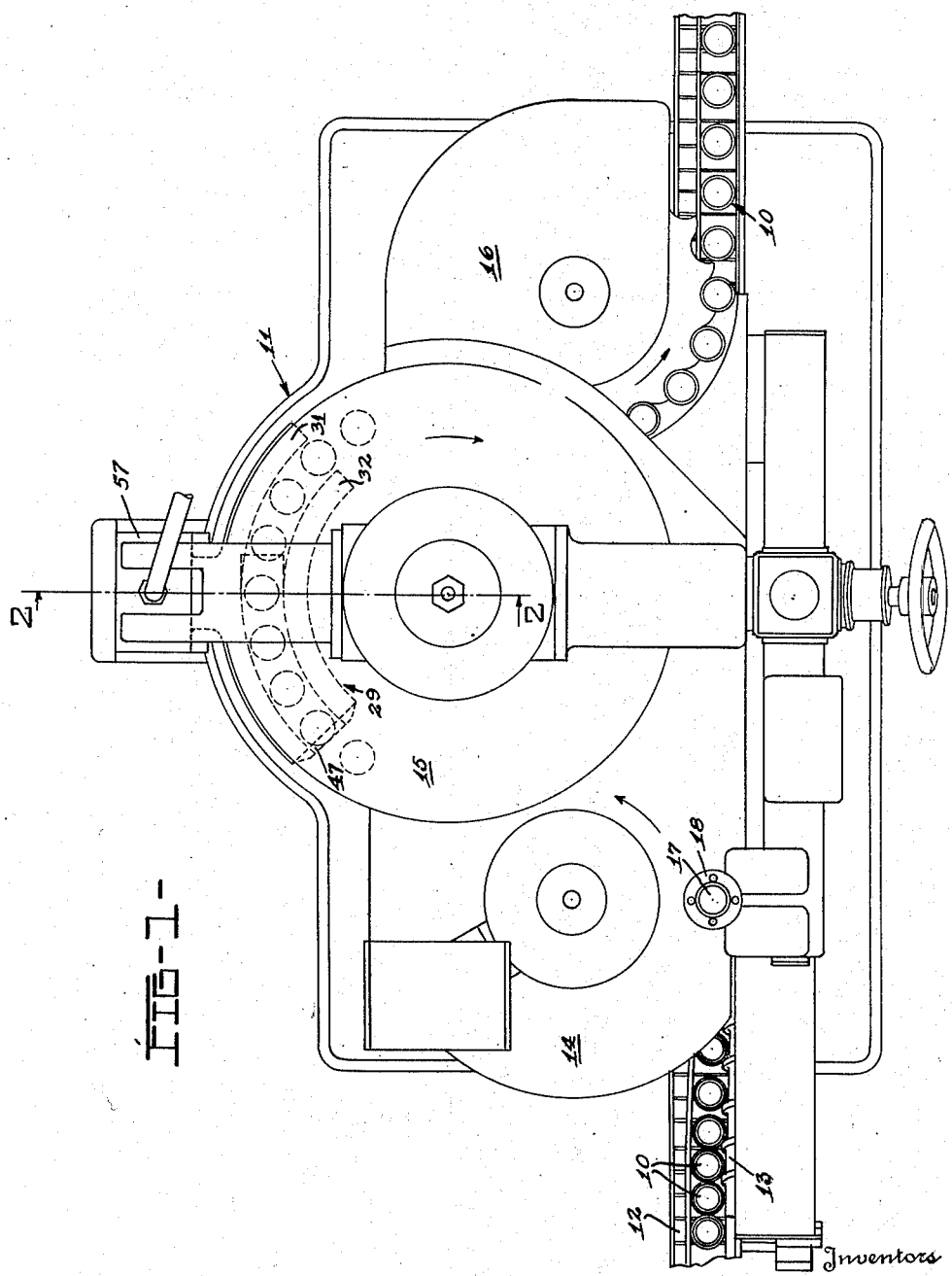

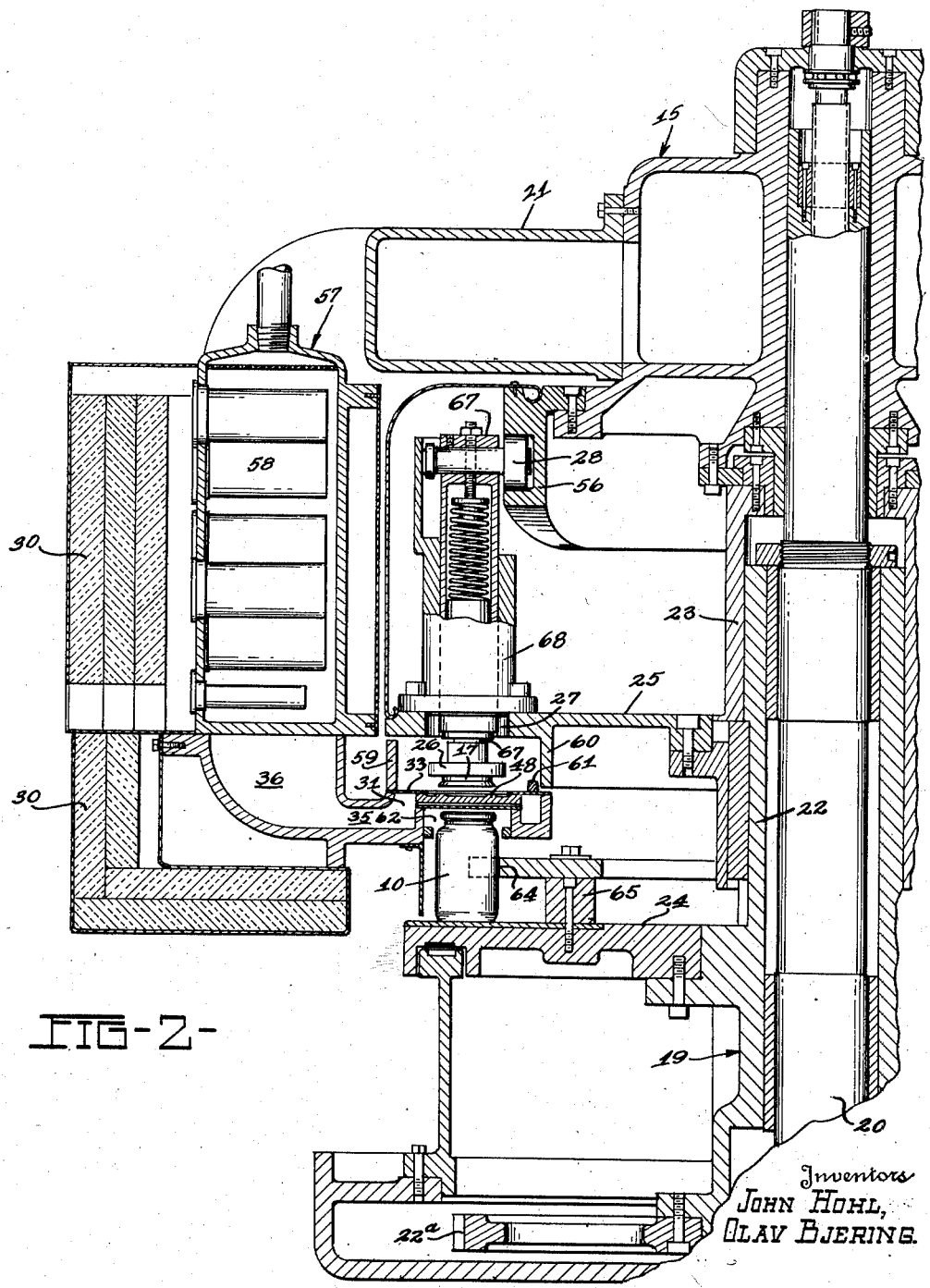

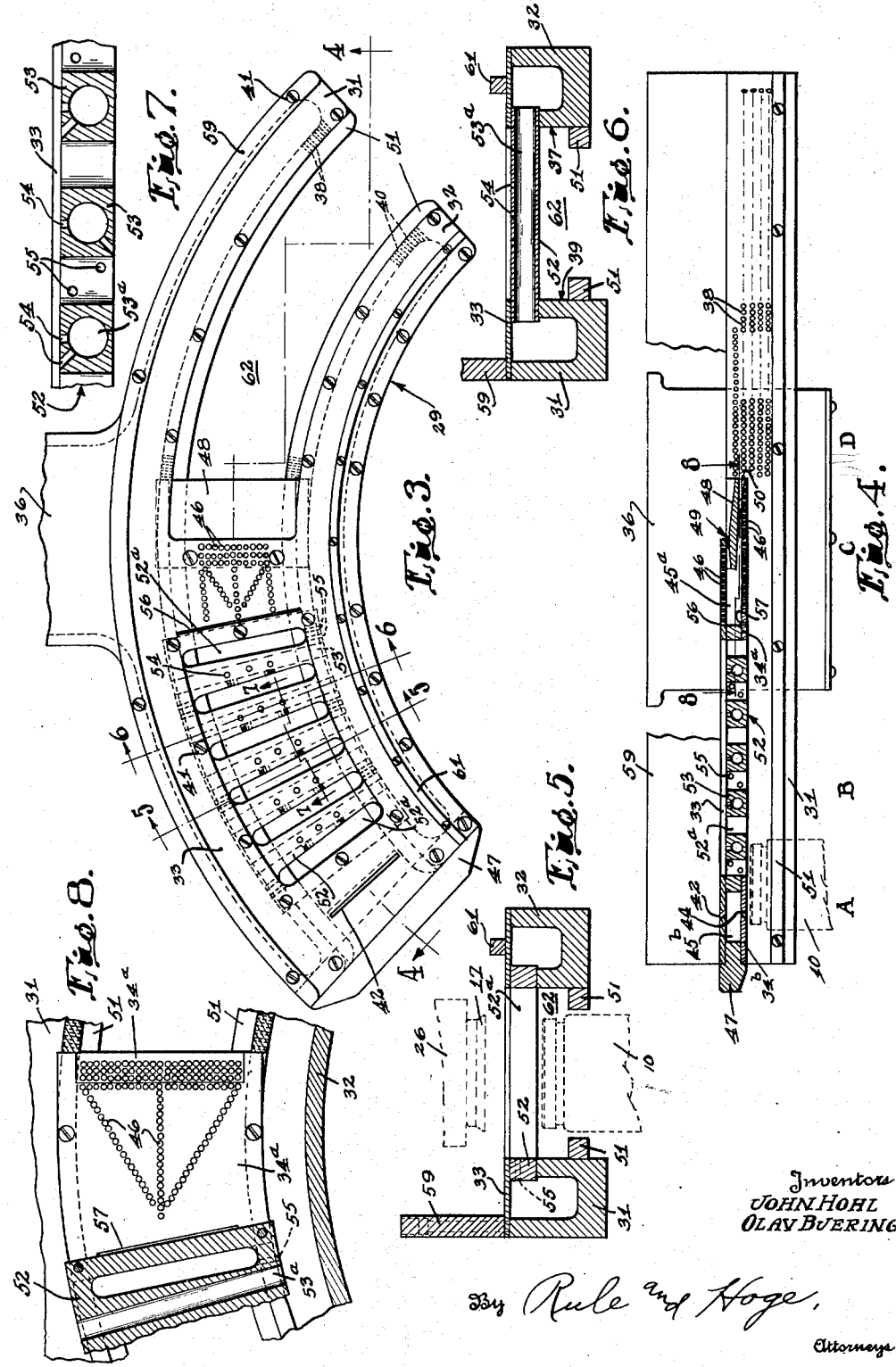

2,620,111

UNITED STATES PATENT OFFICE 2,620,111

METHOD AND APPARATUS FOR SEALING CONTAINERS

John Hohl and Olav Bjering, Toledo, Ohio, assignors to Owens-Illinois Glass Company, a corporation of Ohio Application March 29, 1950, Serial No. 152,542

7 Claims. (Cl. 226—82)

This invention relates to the packaging of commodities in containers and particularly to an apparatus and method for displacing the air in the sealed containers.

A common principle employed in the sealing of commodities in containers is to displace the air in the container with an inert gas, or to displace the air with a vapor such as steam, which, after sealing and cooling of the container, condenses and creates a partial vacuum. Our invention relates to a new and improved method and apparatus for employing this principle in the displacement of air from both the cap and the container.

An object of the invention is to provide a method and means for distributing inert gas or vapor wherein the greater portion of the air is quickly removed from the closure cap and container.

Another object of the invention is to provide a method and means for preventing the infiltration of air into the distributing area.

Another object of the invention is to provide a method and means for concentrating the flow of inert gas or steam at the point where the closure cap and container are brought together.

Another object of the invention is to provide a method and means such that the final sealing of cap and container takes place in a flowing atmosphere of inert gas or vapor.

Other objects of the invention will appear hereinafter.

Basically, our invention comprises a method and apparatus for sealing containers by continuously moving caps and containers in register above and below a gas or steam distributor and subjecting each to a series of sheets or streams of inert gas or vapor and finally sealing the caps to the containers while subjecting them to an atmosphere of gas or vapor.

This application discloses subject matter disclosed and claimed in our copending applications, Serial No. 152,541, filed March 29, 1950, and Serial No. 193,653 filed November 2, 1950, each titled "Method and Apparatus for Sealing Containers."

Referring to the accompanying drawings:

Fig. 1 is a diagrammatic plan view of a rotary sealing machine in which the present invention may be embodied and produced;

Fig. 2 is a part sectional elevation at the line 2—2 on Fig. 1;

Fig. 3 is a plan view of the steam distributor;

Fig. 4 is a sectional view at the line 4—4 on Fig. 3;

Fig. 5 is a sectional view at the line 5—5 on Fig. 3;

Fig. 6 is a sectional view at the line 6—6 on Fig. 3;

Fig. 7 is a sectional view at the line 7—7 on Fig. 3; and

Fig. 8 is a sectional view at the line 8—8 on Fig. 4.

Referring to Fig. 1, previously filled containers 10 are fed into a sealing machine 11 by suitable means, herein shown as a conveyor 12, and spiral spacer and timer 13. The sealing machine comprises three sections 14, 15, and 16. As the containers pass through the first section 14, caps or closures 17 are brought into register with the containers by suitable means shown schematically as 18, and travel above and in register with the containers.

The containers are then transferred to the center or second section 15. In this section, the caps and containers are subjected to the inert gas or vapor and sealed as hereinafter described. The sealed containers are then removed by the third section 16.

As herein described, superheated steam is used, but it should be understood that inert gases might be used if desired with obvious mechanical changes such as the removal of the superheater.

As shown in Fig. 2, the center section 15 comprises a carriage 19, arranged for rotation about a stationary vertical shaft 20. A non-rotating frame member 21 is positioned over the carriage and arranged for up-and-down adjustment on the shaft 20.

The carriage 19 comprises an inner sleeve 22 and an outer sleeve 23 splined to the sleeve 22 and adjustable up and down on said sleeve 22. The carriage also includes a circular table or platform 24 bolted to the sleeve 22. The containers 10 are supported on this platform 24 as they are carried through the inert gas or vapor distributor by the carriage. The containers are spaced on the platform by means of a spacing ring 63 (Fig. 2) formed with pockets or recesses 64, in which the containers are held, the ring 63 being bolted to the platform 24 and spaced thereabove by spacing blocks 65.

A chuck supporting table 25 is bolted to the outer sleeve 23, and supports an annular series of magnetic chucks 26. Each chuck 26 carries a series of small magnets (not shown) by which it is magnetized for holding the caps. The chuck is keyed to a spindle 67 movable up and down in a casing 68, mounted over an opening 27 in the platform 25. The spindle 67 carries a roll 28, running in a cam track formed in the cam 56 which is bolted to the housing 21. The carriage is rotated by a gear 22a bolted to the sleeve 22. The gear is rotated by suitable means (not shown).

A superheater 57 is bolted to the member 21 and comprises electrical heating elements 58. A distributor 29 is fastened to the superheater 57.

Suitable insulating materials 30 are provided around the steam superheater 57 and the distributor 29.

The distributor 29 is arc shaped as shown, for example, in Figs. 1 and 3. Structurally, it comprises outer and inner wall-forming members or channels 31 and 32, U shaped in cross-section, (Figs. 5 and 6), thereby forming channels which extend substantially the full length of the distributor and in which an atmosphere of steam is maintained and circulated as hereinafter described. The channels 31 and 32 are spaced apart to provide a tunnel or passageway 62 (Fig. 6), into which the upper ends of the jars 10 project as they travel through the distributor. An upper plate 33 overlies and forms a cover for the channels 31 and 32 and is attached to the channel walls by screws 41 (Fig. 3). The plate 33 extends the full width of the steam distributor at the extreme left-hand portion thereof and at the center portion thereof (Fig. 3) and thereby bridges the space between the channels at two points. From the middle to the right-hand end of the distributor, the upper plate 33 is extended in the form of comparatively narrow strips covering the channels and leaving the tunnel 62 open, thus permitting the caps 17 to be lowered to sealing position as presently described.

Lower plates 34a and 34b (see Fig. 4) are positioned beneath and parallel with the left-hand portion and the center portion of the upper plate 33, respectively, the plates being spaced to provide steam chests or compartments 45a and 45b, respectively, through which the steam is circulated. The lower plates 34a and 34b bridge the space between the channels 31 and 32, and are secured to the inner walls of the channels. The inner channel walls are lower than the outer walls for a portion of their length in order to space the plates 34a and 34b below the plate 33. With this construction, the steam chests 45a and 45b are wide open to the adjoining channels.

An end piece 47 is positioned to seal one end of the passageway 45b. A mouthpiece 48 is positioned at one end of the passageway 45a and is shaped so that slits or openings 49 and 50 are formed.

The distributor includes a horizontal plate 52 which extends from the steam chest 45a to the steam chest 45b. Said plate is of a width to bridge the space between the channels 31 and 32, and together with the plates 34a and 34b, provides an overhead wall for the left-hand half of the tunnel 62 (Figs. 3 and 6). The plate 52 is seated on the inner walls of the channels 31 and 32 and forms a portion of the channel walls. The plate is formed with elongated openings 52a therethrough, extending transversely of the plate and spaced at intervals therealong. The intermediate sections of the plate are in the form of rectangular bars 53, with bores or openings 53a extending lengthwise therethrough, thus forming tubes extending transversely of the distributor and opening into the channels 31 and 32. These tubes are drilled to provide small lateral openings 54 through the walls of the tubes and spaced at intervals lengthwise of said tubes. Small holes 55, drilled through the plate at the ends of the openings 52a, provide communication between said openings and the channels 31 and 32.

As shown in Fig. 4, the upper plate 33 is provided with a slot 42 extending across the plate near the end which the containers first approach. The slot 42 extends diagonally upward and rearward through the plate. A slot 44 is provided in the lower plate 34b, beneath the slot 42 and extends across the plate and diagonally downward and rearward through the plate.

Additional slots 56 and 57 extending across the entire width of the passageway 62 and vertically through the plates 33 and 34a, respectively, are provided at the end of the plate 52 (Fig. 4).

The upper plate 33 and lower plate 34a are also each provided with a multiplicity of narrowly-spaced perforations 46. These perforations are arranged as shown in Figs. 3 and 8 so that the greatest number is at or near the end of the said plates which the containers last pass.

The inner channel walls, 37 and 39, are provided with perforations, 38 and 40, respectively, in the portions which are not lower than the outer walls (Fig. 4). As shown in Fig. 2, the outer channel 31 is provided at the center of its outer wall with an opening 35 to a steam inlet 36 which in turn is open to the superheater 57.

Guide rails 51, Figs. 3, 5 and 6, extend along the sides of the channels 31 and 32. As shown in Figs. 2, 5 and 6, a wall 59 is provided between the plate 33 and the chuck supporting table 25. This wall 59 extends along the outer edge of the plate 33. A projection 60 of the chuck supporting table 25 provides a similar wall along the inner edge of the plate 33. A sealing rail 61 is provided along the inner edge of the upper plate 33, as shown in Figs. 5 and 6.

When a container 10, supported on the rotating platform 24 (Fig. 2), approaches the steam distributor 29, a cap 17 is maintained in register with it by means of the magnetic chuck 26. As the container and cap continue their travel, they pass successively into and through zones A, B, C, and D (Fig. 4), of the steam distributor. Steam from the superheater is supplied through the inlet 36, Fig. 2, to the steam distributor and flows freely through the opening 35 to the channel 31, the steam chests 45a and 45b, the tubes 53 and channel 32, and thereby to every part of the steam distributor and out of each of the openings and slots, as hereinafter described.

As the cap and container approach zone A (Fig. 3) they are subjected to the action of the streams or sheets of vapor emanating from the steam chest 45b and directed outwardly and rearwardly through the slots 42 and 44. These streams scavenge or sweep the air out of the cap and the opening or head space of the container and also serve as a wall or curtain to prevent the infiltration of air into the zones of the steam distributor.

The cap and container then move into zone B where they are subjected to an atmosphere of vapor provided by steam flowing radially from the tubes 53 through the openings 54 and horizontally and transversely from the openings 55. The construction permits the steam to move freely around the tubes, thus subjecting the cap and container to the same atmosphere of steam. This tends to replace the air by steam of identical quality and to raise the temperature of the cap and container to the same degree.

As the cap and container continue their travel, they enter zone C where the concentration of vapor is greater due to the vertical slots 56 and 57 and the greater number of proximate perforations. Also in zone C, the cap and container move through the streams or sheets of vapor emanating in a forward direction from the slots 49 and 50. The combination of the greater concentration of vapor and the stream movement of vapor provides a final scavenging or sweeping action whereby any remaining air is removed from the cap and opening of the container and also serves as a curtain to prevent infiltration of air into the steam distributing area.

The cap and container then move into zone D where an atmosphere of vapor is provided by fine streams of vapor from the openings 38 and 40 in the channel walls of the steam distributor. In this zone, the cap is moved down and sealed on the container by the chuck 26 which is actuated by the cam 56 (Fig. 2). The sealed container is then removed from the machine by the section 16 (Fig. 1).

As shown in Figs. 5 and 6, the guide rails 51, in addition to aiding in the guiding of the containers, serve as a means of retarding the infiltration of air into the space below the steam distributor. The walls 59 and 60 and the sealing rail 61 serve the same purpose above the steam distributor.

The particular arrangement of the perforations 46 shown in Figs. 3 and 8, has been found preferable but it should be understood that the arrangement may be modified without deviating from the spirit of our invention.

The invention as herein illustrated and described is adapted for use with superheated steam which we have found is desirable for use in packaging and sealing certain products, and may also be used with steam at lower temperatures or steam vapor which is preferable for use with certain other products. Still other inert gases may be used, heated if desired. The term "inert gas" as herein used, includes superheated steam, steam vapor and any other gases such, for example, as nitrogen and carbon dioxide, which do not include free oxygen or oxidizing agents and which are suitable for the specified purposes of our invention, and also includes combinations of such gases.

The invention is herein described as applied to a rotary type sealing machine but it should be understood that this does not limit the application of our method or apparatus to the rotary type since it may be satisfactorily applied to other types.

Modifications may be resorted to within the spirit and scope of our invention as defined in the appended claims.

We claim:

1. The method of sealing containers which consists in continuously moving caps and containers in register above and below distributing means respectively and successively subjecting each cap and container as it is moved along in register to a diagonal sheet of inert vapor directed outwardly and rearwardly, a series of fine streams of inert vapor, a vertical sheet of inert vapor, a concentrated group of vertical streams of inert vapor and a horizontal sheet of inert vapor directed in the direction of travel, and sealing said caps to said containers while subjecting same to a series of fine transverse streams of inert vapor.

2. In a rotary sealing machine, a steam distributor comprising an outer arcuate channel, an inner arcuate channel spaced inwardly from said outer channel, said channels having openings adjacent to said space for a portion of their length, plates interposed between said channels above and below said openings thereby forming an enclosed space between said channels, one end of said enclosed space sealed by suitable means, slots through said plates near the sealed end extending across the width of said plates and upwardly and outwardly away from said enclosed space and toward the sealed end, a mouthpiece spaced in the other end of the distributor and having a thickness less than that of the said enclosed space, such that two converging slots are provided at the end of said distributor, slots through said plates in advance of the mouthpiece and extending across the width of said plates and vertically through said plates, said plates having central portions cut away providing an opening, tubes spaced transversely across said openings, said tubes having radial perforations, said plates being provided with perforations in the space between said slots and said mouthpiece, the greatest concentration of said perforations being at or near said mouthpiece, and means for introducing steam to said distributor so that it may flow through said openings, spaces, and slots.

3. In a container sealing apparatus, a steam distributor, means for continuously moving containers below a portion of said steam distributor, means for moving caps for said containers above a portion of said steam distributor and in register with said containers, said steam distributor comprising slots near the point of entrance such that a stream of steam is directed upwardly and rearwardly against said cap, and downwardly and rearwardly against the opening of said container, said distributor having horizontal central portions cut away providing an opening, tubes longitudinally spaced and extending transversely across said opening, said tubes having diagonal and vertical perforations, vertical perforations in said steam distributor progressively along the path of said containers and caps, the greater number of perforations being placed near the exit to said steam distributor, means for concentrating the flow of said steam at the exit of said steam distributor, said steam distributor being provided with perforations along the sides, and means for sealing said caps to said containers while in said latter zone of the perforations.

4. In apparatus of the character described, means for conveying open filled containers and closures spaced thereabove along a horizontal path, a steam distributor positioned between the containers and closures in a part of the path of travel of said containers and closures, said distributor including means for directing steam downwardly into the containers and upwardly into and about the closures, the last-named means in part also directing steam both upwardly and downwardly substantially at the extremities of said distributor to thereby provide curtains of steam for retarding ingress of outside air to the spaces immediately above and below the distributor and means for attaching the closures to the containers immediately following their movement beyond said distributor and simultaneously entrapping steam within the containers, said steam distributor including horizontal longitudinally-spaced conduits extending transverse to the direction of travel of the containers and closures, said conduits provided with a plurality of perforations for directing the flow of steam to the containers and closures.

5. The method of sealing containers which consists in continuously moving caps and containers in register above and below distributing means respectively and successively subjecting each to a sheet of inert vapor, an atmosphere of freely moving inert vapor, a sheet of inert vapor, a concentrated group of vertical streams of inert vapor and a horizontal sheet of inert vapor directed in the direction of travel of the container and caps, and sealing said caps to said containers while subjecting same to a series of fine tranverse streams of inert vapor.

6. In a container sealing apparatus, a steam distributor, means for continuously moving containers below a portion of said steam distributor, means for moving caps for said containers above a portion of said steam distributor and in register with said containers, said steam distributor comprising slots near the point of entrance such that a stream of vapor is directed upwardly and rearwardly against said cap, and downwardly and rearwardly into the opening of said container, said distributor having central portions cut away providing an opening, tubes spaced transversely across said opening, said tubes having diagonal and vertical perforations, vertical perforations in said steam distributor progressively along the path of said containers and caps, the greater number of perforations being placed near the exit to said steam distributor, a mouthpiece positioned at the exit end of said steam distributor to provide two flat horizontal streams of steam directed along and into the path of the moving caps and containers respectively, slots in said distributor in advance of the mouthpiece and extending across and vertically through said distributor, said steam distributor being provided with perforations along the sides, and means for sealing the caps to said containers while in said zone of the perforations.

7. The method which comprises bringing a container and a closure cap therefor into a relative position in which the cap is spaced above and in register with the container, continuously moving the cap and container while said relative position is maintained, horizontally through a zone in which they are treated with an inert gas, said treatment comprising first directing sheets of the inert gas between the cap and container and in directions inclined and extending rearwardly with respect to the direction of movement of the cap and container, then directing a series of fine streams of inert gas against the cap and container and into the space therebetween, then enveloping the cap and container in a vertical sheet of inert gas extending transversely to the said direction of travel and through which sheet of inert gas the cap and container are caused to travel, then passing the cap and container through a concentrated group of vertical streams of inert gas through a horizontal sheet of inert gas extended in said direction of travel, and bringing the cap and container together and sealing the cap to the container and subjecting the cap and container to a series of transverse streams of inert gas while the cap and the container are being brought together and sealed.

JOHN HOHL.
OLAV BJERING.

REFERENCES CITED

The following references are of record in the file of this patent:

UNITED STATES PATENTS

| Number | Name | Date |
|---|---|---|
| 2,107,237 | Davies | Feb. 1, 1938 |
| 2,317,470 | Marx | Apr. 27, 1943 |
| 2,322,250 | Murch | June 22, 1943 |
| 2,330,598 | Kronquest | Sept. 28, 1943 |
| 2,337,170 | Wakeham | Dec. 21, 1943 |
| 2,362,799 | Boyd et al. | Nov. 14, 1944 |
| 2,362,841 | Minaker | Nov. 14, 1944 |